United States Patent [19]
Miura

[11] Patent Number: 4,885,086
[45] Date of Patent: Dec. 5, 1989

[54] HYDROPHILIC MICROPOROUS MEMBRANE AND PROCESS FOR PREPARING SAME

[75] Inventor: Morikazu Miura, Yokohama, Japan
[73] Assignee: Asahi Kasei Kogyo Kabushiki Kaisha, Osaka, Japan
[21] Appl. No.: 221,573
[22] Filed: Jul. 20, 1988
[30] Foreign Application Priority Data

Jul. 27, 1987 [JP] Japan .................................. 62-187037

[51] Int. Cl.$^4$ ............................................... B01D 13/01
[52] U.S. Cl. .............................. 210/321.8; 210/321.89; 210/500.27; 210/500.36
[58] Field of Search ....................... 604/84; 264/41, 22, 264/45.1, 45.5, 48, 209.1, 232, 340, 349, DIG. 48, DIG. 62; 424/486; 210/321.78, 321.79, 321.8, 321.87, 321.89, 500.27, 500.36

[56] References Cited

U.S. PATENT DOCUMENTS 4,681,582 7/1987 Yamamoto ........................... 424/486

FOREIGN PATENT DOCUMENTS 0221046 6/1987 European Pat. Off. .

*Primary Examiner*—Frank Sever
*Attorney, Agent, or Firm*—Finnegan, Henderson, Farabow, Garrett & Dunner

[57] ABSTRACT

A hollow fiber microporous membrane of a polyolefin having a polyvinyl alcohol chemically bonded to the inner and outer surfaces of the hollow fiber membrane and the surfaces defining the pores thereof exhibits a good hydrophilic property as well as good chemical resistance, mechanical strength, water permeation performance and durability. This membrane has an average pore diameter of 0.01 to 5 μm and a porosity of 20 to 80%. The polyvinyl alcohol/polyolefin composition ratio is constant in the membrane thickness direction of the hollow fiber, the oxygen/carbon atomic ratio X on the outer surface of the hollow fiber microporous membrane is 10 to 50%, and the condition defined by the ratio $X/2 \geq Y$ is satisfied between said oxygen/carbon atomic ratio X and the oxygen/carbon atomic ratio Y in the entire microporous membrane. The membrane is prepared by irradiating a hollow fiber microporous membrane of a polyolefin with ionizing radiations, reacting the membrane with vinyl acetate and then hydrolyzing the membrane.

8 Claims, 3 Drawing Sheets

HYDROPHILIC MICROPOROUS MEMBRANE AND PROCESS FOR PREPARING SAME

BACKGROUND OF THE INVENTION (1) Field of the Invention

The present invention relates to a hydrophilic hollow fiber microporous membrane suitable for the removal of fine particles and bacteria contained in water or an aqueous solution, and a process for the preparation of this membrane.

More specifically, the membrane of the present invention is advantageously used for the production of germ-free water, the separation of valuable components (e.g., enzymes) from cells in a fermentation bulk liquid, and the removal of iron cladding from nuclear power condensed water.

(2) Description of the Related Art

A variety of microporous membranes having fine pores of the micron-to-submicron order, ranging from membranes having a laboratory size to membranes having an industrial size, are marketed as microfilters.

These membranes are roughly divided into plain membranes (film-shaped membranes) and hollow fiber-shaped membranes. Hollow yarn-shaped membranes are superior to plain membranes in that cross-flow and back washing is possible, and when modules are constructed, the membrane pack density can be high.

As the material of the hollow fiber membrane, there can be mentioned hydrophobic polymers represented by polyolefins and hydrophilic polymers represented by cellulose derivatives.

A polyolefin microporous membrane has an excellent chemical resistance and a high strength, but when water or an aqueous solution is treated, since the membrane per se is hydrophobic, a pretreatment operation of passing a water-soluble organic solvent having a low surface tension, such as ethanol, in advance, and substituting the solvent with water is carried out. Nevertheless, even if this pretreatment is performed, bubbles become entangled in the membrane during the operation or while stored, and if the membrane is dried, water can not pass through such bubble-entangled portions, resulting in a reduction of the water permeation rate.

The foregoing problems do not arise in a microporous membrane composed of a hydrophilic polymer, such as a cellulose type microporous membrane, but this microporous membrane has poor chemical resistance, such as acid or alkali resistance, and has poor mechanical strength.

As a means for solving the foregoing problems and providing a microporous membrane having an excellent hydrophilic property, chemical resistance, and mechanical strength, various methods for modifying the surfaces of a hydrophobic microporous membrane including the surfaces defining the pores have been investigated.

As the surface-modifying method, there can be mentioned a chemical modification method for chemically modifying the surface with a chemical, a coating method for dissolving a hydrophilic polymer in a solvent therefore, dipping a porous membrane in the solution, and drying the membrane to impart a hydrophilic property to the surfaces of the pores, a plasma method, and a grafting method.

For Example, Japanese Examined Patent Publication No. 61-2,100 discloses a chemical modification method in which a polyolefin porous membrane is sulfonated; Japanese Unexamined Patent Publication No. 61-125,408 discloses a coating method in which an ethylene/vinyl acetate copolymer is coated and saponified; Japanese Examined Patent Publication No. 62-19,208 discloses a coating method using polyethylene glycol or other hydrophilic polymeric materials; Japanese Unexamined Patent Publication No. 61-86,908 discloses a plasma method in which a hollow fiber microporous membrane is treated by low-temperature plasma; and Japanese Examined Patent Publication No. 56-44,098 discloses a grafting method in which a thin porous film of a high polymer, different from a hollow fiber microporous membrane, is modified by radiation grafting.

The chemical modification method has a problem, however, in that the mechanical strength is lowered by a deterioration of the membrane material, and the coating method has a problem in that, since the membrane material is not chemically bonded to the coated hydrophilic polymer, the coating agent is dissolved therefrom. Furthermore, in the plasma method, it is difficult to uniformly treat the surfaces of pores of the porous membrane, and even if the porous membrane can be rendered hydrophilic by the plasma method, the water permeation pressure is 2.5 kg/cm$^2$ or more, as shown in the examples of Japanese Unexamined Patent Publication No. 61-86,908, and the hydrophilic property is still unsatisfactory.

In the modification by the grafting method, as disclosed in the examples of Japanese Examined Patent Publication No. 56-44,098, it is known that, if a hydrophilic monomer such as acrylic acid or vinylpyridine is grafted, the water permeation performance is drastically reduced to a value of from one of scores to one of hundreds, and accordingly, the grafting method is still unsatisfactory as a surface-modifying method for improving the surface characteristics alone while maintaining the inherent characteristics of the material.

As seen from the foregoing description, although a hollow fiber microporous membrane having satisfactory characteristics such as hydrophilic property, chemical resistance, mechanical strength, water permeability, and durability is strongly desired, such a membrane has not been previously developed.

SUMMARY OF THE INVENTION

Therefore, a primary object of the present invention is to solve the problem of how to impart a durable hydrophilic property to the inner and outer surfaces of a polyolefin hollow fiber microporous membrane and the surfaces defining the pores thereof while maintaining the inherent mechanical strength, chemical resistance, and water permeability of the polyolefin membrane, and to provide a hollow fiber microporous membrane in which these characteristics are satisfactory.

In accordance with the present invention, there is provided a hollow fiber microporous membrane of a polyolefin having a polyvinyl alcohol chemically bonded to the inner and outer surfaces of the hollow fiber membrane and the surfaces defining the pores thereof, and having an average pore diameter of 0.01 to 5 $\mu$m and a porosity of 20 to 80%, wherein the polyvinyl alcohol/polyolefin composition ratio is constant in the membrane thickness direction of the hollow fiber, the oxygen/carbon atomic ratio X on the outer surface of the hollow fiber microporous membrane is 10 to 50%, and the condition defined by the ratio $X/2 \geqq Y$ is satisfied between the oxygen carbon atomic ratio X and the oxygen/carbon atomic ratio Y in the entire microporous membrane.

This hollow fiber microporous membrane has a hydrophilic property and satisfactory characteristics such as chemical resistance, mechanical strength, water permeability, and durability.

DESCRIPTION OF THE PREFERRED EMBODIMENTS

Figure 1:
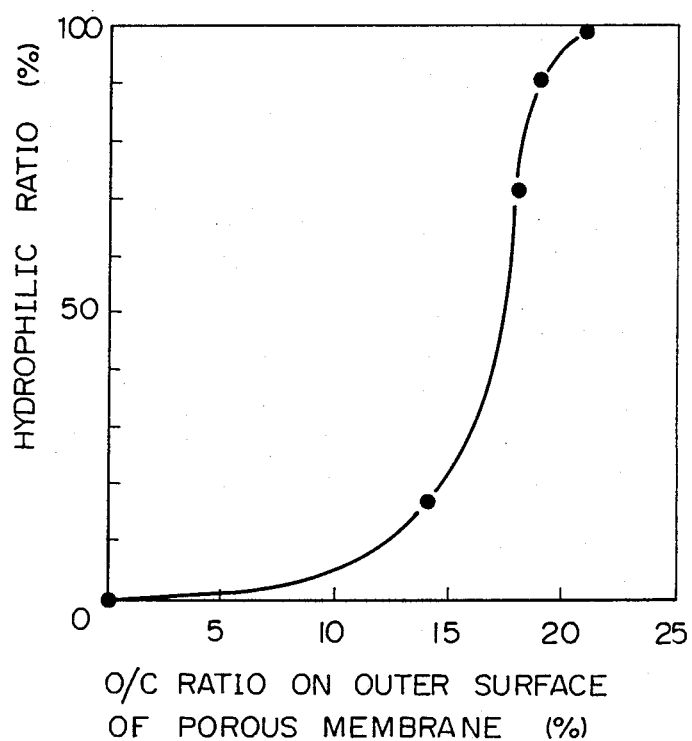
FIG. 1 is a diagram illustrating the relationship between the O/C atomic ratio X (%) on the outer surface and the hydrophilic ratio (%) in the microporous membrane of the present invention.

The present invention will now be described in detail.

The definition of the term "hydrophilic property" as used in the present invention will now be described. Namely, the hydrophilic hollow fiber microporous membrane referred to in the present invention is a membrane in which the pressure under which permeation of water to the outer side is observed when a water pressure is applied from the interior of the hollow fiber in the dry state, namely, the water permeation pressure, is not higher than 0.8 kg/cm$^2$ and the water permeability of the dry film under 1 kg/cm$^2$ is maintained at a level of at least 15% of the water permeability of the membrane pre-treated with ethanol.

To impart this hydrophilic property to a polyolefin hollow fiber microporous membrane, a polyvinyl alcohol is chemically bonded to the inner and outer surfaces of the hollow fiber membrane and the surfaces defining the pores thereof. The chemical bonding referred to in the present invention means that, even though the polyvinyl alcohol is not subjected to an insolubilization treatment such as acetal crosslinking, if the membrane is washed with hot water at a temperature higher than 80° C., the weight loss of the membrane is not greater than 0.1%.

To ensure that the membrane has a satisfactory hydrophilic property, the polyvinyl alcohol/polyolefin ratio must be constant in the thickness direction of the membrane and the oxygen,/carbon atomic ratio X on the outer surface of the hollow fiber microporous membrane must be 10 to 50%, preferably 15 to 50%, especially preferably 20 to 50%. The value of X can be determined by X-ray photoelectron spectroscopy: In this determination, the measurement is conducted at at least 5 different points, and the mean value is designated as X. The distribution of the polyvinyl alcohol/polyolefin ratio in the direction of the membrane can be determined, for example, based on the oxygen atom/carbon atom ratio determined by a wavelength dispersion type X-ray microanalyzer or based on the IR spectrum of a slice cut from the membrane in the thickness direction, at a thickness smaller than 1/10 of the thickness of the membrane, by a microtome. The statement that this ratio is constant means that the polyvinyl alcohol/polyolefin composition ratio in the direction of the membrane thickness is in the range of from 80 to 120, assuming the mean value to be 100.

To attain a good mechanical strength and chemical resistance in addition to good hydrophilic characteristics, the oxygen/carbon atomic ratio Y of the microporous membrane, determined by an ordinary analysis method such as the combustion method, must satisfy the condition defined by the ratio $Y \leq X/2$, preferably $Y \leq X/2.5$, especially preferably $Y \leq X/3$.

The average pore diameter of the porous membrane of the present invention is 0.01 $\mu$ to 5 $\mu$m. The average pore diameter referred to herein is that measured by a mercury porosimeter, and the range of the average pore diameter is set in view of the practical performance. If the average pore diameter is outside this range, the permeation rate or the efficiency of removal of fine particles is unsatisfactory.

The porosity referred to herein is a value obtained by dividing a volume of water (pore volume) obtained by the difference between the weight of the dry membrane and the weight of the membrane after filling ethanol in pores of the membrane and substituting, i.e., replacing the ethanol with water, by the volume calculated as the product of the sectional area of the hollow fiber and the length thereof, and by multiplying the obtained value by 100. The porosity of the porous membrane of the present invention is within the range of from 20% to 80%. If the porosity is outside this range, the membrane has an unsatisfactory permeation rate, mechanical strength, and the like.

As the polyolefin to be used in the present invention, there can be mentioned polyethylene, polypropylene, polybutene, poly-4-methylpentene-1, mixtures thereof, and copolymers of at least two of ethylene, propylene, butene, 4-methylpentene-1 and hexene. In view of the balance among the chemical resistance, mechanical strength, and cost, polyethylene and polypropylene are preferred.

In a hollow fiber microporous membrane, the smaller the inner diameter, the larger the pressure loss, and conversely, an increase of the inner diameter results in a lowering of the mechanical strength. From this viewpoint, in the hollow fiber microporous membrane of the present invention, preferably the inner diameter is 0.1 to 10 mm.

In view of the balance between the permeation rate and mechanical strength, preferably the wall thickness of the hollow fiber microporous membrane is 0.05 to 5 mm.

Where a liquid having a high viscosity and containing large sized foreign matters, such as a fermentation bulk liquid, is treated, since inner pressure filtration is carried out by using a hollow fiber microporous membrane, the inner diameter of the hollow fiber must be at least 1 mm, preferably at least 1.5 mm, especially preferably at least 2 mm. In this case, to increase the strength of the membrane, preferably the wall thickness of the membrane is 300 to 500 $\mu$m or larger.

The process for the preparation of the hollow fiber microporous membrane described hereinbefore will now be described. The preparation process of the present invention is characterized in that a polyolefin hollow fiber microporous membrane having an average pore diameter of 0.01 to 5 $\mu$m and a porosity of 20 to 80% is irradiated with ionizing radiations, and then the membrane is reacted with vinyl acetate and hydrolyzed.

The following two effects are attained according to the process of the present invention. First, according to the process of the present invention, both a thin hollow fiber microporous membrane and a thick hollow fiber microporous membrane can be treated uniformly in the wall thickness direction, and second, a good hydrophilic property can be imparted to the membrane while maintaining the permeation characteristics of the starting membrane.

In the present invention, α-rays, β-rays, γ-rays, accelerated electron beams, and X-rays are examples of the rays used as the ionizing rays. From the practical viewpoint, accelerated electron beams and γ rays are preferred. When a thick hollow fiber microporous membrane is treated, use of γ rays is especially preferred from the viewpoint of the treatment uniformity.

An appropriate irradiation dose differs according to the kind of the polyolefin, but it is generally preferred that the irradiation dose is 5 to 30 Mrad.

To effectively utilize radicals generated by irradiation, for the grafting reaction without deactivation thereof, the irradiation is carried out at a temperature not higher than 30° C., preferably not higher than −10° C., especially preferably not higher than −50° C. When a thick membrane is treated with accelerated electron beams, to control the generation of heat at a low level, the irradiation must be carried out at a low irradiation dose and sufficient cooling should be conducted.

The process of the present invention is characterized in that vinyl acetate is used as the grafting monomer, and after irradiation with ionizing radiations, the polyolefin hollow fiber microporous membrane is reacted with vinyl acetate and then hydrolyzed.

As the grafting method for the surface modification, the method disclosed in Japanese Examined Patent Publication No. 56-44,098, as mentioned hereinbefore, is used for the treatment of a thin porous film. In the examples, when a porous membrane is grafted with acrylic acid at a grafting ratio of 18%, the permeability is reduced to 3.5% of the permeability of the ungrafted membrane, and when the membrane is grafted with vinylpyridine at a grafting ratio of 17%, the permeability is reduced to 0.4% of that of the ungrafted membrane. In "Development of Hollow Fiber Filtration Membranes by Radiation Graft Polymerization Process", Chemical Engineering, July, 1987, pages 17 through 20, it is taught that, by introducing a phosphoric acid group into a porous membrane, the permeability is drastically degraded, and thus, it is known that, if a hydrophilic polar group is introduced into a porous membrane, the permeability of the base membrane is drastically reduced.

Surprisingly, it has been found that, if vinyl acetate is used as the grafting monomer and a polyolefin hollow fiber microporous membrane irradiated with ionizing radiations is reacted with vinyl acetate and then hydrolyzed to introduce a hydroxyl group into the membrane, reduction of the permeability of the base membrane is remarkably controlled.

In the present invention, when the polyolefin hollow fiber porous membrane irradiated with ionizing radiations is reacted with vinyl acetate, from the viewpoint of prevention of a reduction of the permeability of the base membrane, preferably the vinyl acetate is reacted in the gaseous stage rather than in the liquid state.

The grafting reaction temperature is preferably from −20° C. to 50° C. If the temperature is lower than −20° C., the grafting reaction rate is low and good results cannot be practically obtained. If the temperature exceeds 50° C., since the rate of reaction is too high, a uniform treatment of the membrane is difficult at the gas-phase reaction, or the formation of homopolymer is increased at the liquid phase reaction. Where the treatment is industrially carried out on a large scale, to attain treatment uniformity, preferably the treatment is carried out at a low temperature such as −10° C. to 15° C.

In the present invention, since it is intended to impart a good hydrophilic property to a hollow fiber microporous membrane, hydrolysis must be thoroughly carried out. From this viewpoint, preferably, in the transmission infrared spectrum, the ratio of the absorbance of the peak attributed to the hydroxyl group in the vicinity of 3400 cm$^{-1}$ to the absorbance of the peak attributed to the carboxyl group in the vicinity of 1730 cm$^{-1}$ (peak height at 3400 cm$^{-1}$/peak height at 1730 cm$^{-1}$) is at least 10.

As the result of the investigations of properties of the hydrophilic hollow fiber microporous membrane of the present invention, a very interesting phenomenon was found.

Namely, interaction between a porous membrane and a protein is a very interesting phenomenon from the viewpoint of separation of a valuable proteinaceous substance, such as an enzyme from cells. When the protein-adsorbing property of the hydrophilic microporous membrane obtained according to the present invention was examined, it was found that the protein-adsorbing property has a relation to the oxygen/carbon atomic ratio X on the surface of the microporous membrane, and that if X exceeds 10%, the adsorption of proteins is drastically controlled and the adsorption amount is less than 1/5 of the adsorption amount of the ungrafted membrane. This phenomenon is fully in agreement with the hydrophilic behavior.

When the hydrophilic polyethylene hollow fiber microporous membrane was subjected to a steam treatment, it was found that the hydrophilic property was reduced, but if the membrane having the thus degraded hydrophilic property was treated with hot water at a temperature below 100° C., a good hydrophilic property was restored. It is presumed that this phenomenon occurs because the hydroxyl groups on the surface of the porous membrane duck in and out of the interior, and the occurrence of this phenomenon supports the assumption that grafting is effected in very close proximity to the surfaces of pores.

The membrane obtained according to the present invention has hydroxyl groups on the surface thereof and various functional groups can be introduced by utilizing these hydroxyl groups. For example, epoxy groups can be introduced by reacting the hydroxyl groups with epichlorohydrin, and then the epoxy groups can be modified with a nucleophilic reagent such as an amine.

The construction and effects of the present invention will now be described in detail with reference to the following examples that by no means limit the scope of the invention.

Methods for determining physical properties, adopted in the examples, will first be described.

(1) Average pore diameter

The average pore diameter was measured by a mercury porosimeter.

(2) Porosity

The porosity was calculated according to the following formula:

$$\text{Porosity (\%)} = \frac{(W_1 - W_2)/D}{(r_1^2 - r_2^2)\pi \cdot l} \times 100$$

wherein $W_1$ stands for the weight (g) of the hydrous membrane, $W_2$ stands for the weight (g) of the dry membrane, D stands for the density (g/ml) of water at the time of the measurement of the weight, $r_1$ stands for the outer radius (cm) of the hollow fiber, $r_2$ stands for the inner radius (cm) of the hollow fiber, and l stands for the length (cm) of the hollow fiber.

(3) Water permeation pressure

A water pressure was applied from the inner side of the dry hollow fiber membrane and the lowest pressure (kg/cm$^2$) under which permeation of water to the outer side was observed with the naked eye was measured as the water permeation pressure.

(4) Water permeation quantity after ethanol treatment (measured under a pressure difference of 1 kg/cm$^2$)

The hollow fiber was immersed in ethanol in advance, the ethanol in the pores was replaced by pure water, and the permeation quantity of pure water at 25° C. (l/h·m$^2$·atm, 25° C.) was measured. It should be noted that the pure water is water formed by removing ions from water by ion exchange and subjecting the deionized water to ultrafiltration.

(5) Water permeation quantity under pressurization of 1 kg/cm$^2$ (measured under pressure difference of 1 kg/cm$^2$)

A water pressure of 1 kg/cm$^2$ was applied from the inner side of the dry hollow fiber membrane and the membrane was allowed to stand in this state for 30 seconds, and the permeation quantity of pure water at 25° C. was measured.

(6) Hydrophilic ratio

The hydrophilic ratio was calculated according to the following formula:

$$\text{Hydrophilic ratio (\%)} = \frac{\text{Water permeation quantity under pressurization of 1 kg/cm}^2}{\text{Water permeation quantity after ethanol treatment}} \times 100$$

(7) Oxygen/carbon (O/C) atomic ratio X on the outer surface of the hollow fiber microporous membrane A sample air-dried in advance and vacuum-dried at 60° C. (3 to 5 hours) was used, and the measurement was carried out by X-ray photoelectron spectroscopy under a vacuum of 10$^{-7}$ Torr or less. The incident angle of X-rays to the sample was 45°, the measurement was conducted at at least 5 points, and the mean value of the oxygen/carbon atomic ratio X was calculated.

(8) Oxygen/carbon atomic ratio Y of hollow yarn-shaped microporous membrane

The oxygen/carbon (O/C) atomic ratio Y of the hollow fiber microporous membrane was determined according to the combustion method.

(9) Grafting ratio

The grafting ratio was calculated according to the following formula:

$$\text{grafting ratio (\%)} = \frac{W_B - W_A}{W_A} \times 100$$

wherein $W_A$ stands for the weight of the hollow fiber before grafting and $W_B$ stands for the weight of the hollow fiber after grafting (inclusive of post treatment such as hydrolysis or sulfonation).

COMPARATIVE EXAMPLE 1

A composition comprising 20.0 parts by weight of high-density polyethylene, 55.8 parts by weight of di-(2-ethylhexyl)phthalate (DOP), and 24.2 parts by weight of finely divided silica was preliminarily blended, and the composition was extruded in the form of a hollow fiber having an inner diameter of 0.7 mm and a wall thickness of 0.26 mm by using a biaxial extruder having a screw diameter of 30 mm. Then, DOP was extracted from the hollow fiber by using 1,1,1-trichloroethane and silica was extracted by a 40% aqueous solution of caustic soda at 60° C., followed by water washing and drying, to obtain a hollow fiber microporous membrane A.

With respect to the membrane A, the grafting ratio, the average pore diameter, the porosity, the water permeation pressure, the water permeation amount after the ethanol treatment, the water permeation quantity under a pressure of 1 kg/cm$^2$, the hydrophilic ratio and the O/C ratios X and Y of the outer surface and the entire membrane, respectively, were determined. The results are shown in Table 1.

EXAMPLE 1

The membrane A obtained in Comparative Example 1 was irradiated in a nitrogen atmosphere with 20 Mrad at a dry ice temperature and an irradiation dose of 1.05 Mrad/hr using Co-60 as the irradiation source.

The irradiated membrane was transferred to a reactor in a nitrogen atmosphere and the pressure in the reactor was reduced below 0.1 Torr. Vinyl acetate monomer, from which dissolved oxygen had been removed in advance, was brought in the gaseous phase into contact with the membrane at 40° C. to effect reaction. At this step, the amount of the grafted monomer could be adjusted by controlling the amount of the introduced monomer.

The vinyl acetate-grafted membrane was washed with methyl ethyl ketone, dried and hydrolyzed at 60° C. by using a liquid comprising water, ethanol and KOH at a weight ratio of 5/5/3. Then, the membrane was washed with water, thoroughly washed with hot water maintained above 80° C., and dried at 60° C. for 5 hours to obtain a membrane B.

The data of the obtained membrane B is shown in Table 1.

COMPARATIVE EXAMPLE 2

In the same manner as described in Example 1, the membrane A was irradiated and transferred into the reactor, the pressure was reduced, and the gas phase reaction with acrylic acid monomer was carried out at 40° C. The membrane was washed with water, thoroughly washed with hot water, and dried to obtain a membrane C. The data of the membrane C is shown in Table 1.

COMPARATIVE EXAMPLE 3

In the same manner as described in Example 1, the membrane A was irradiated and transferred into the reactor, the pressure was reduced, and the gas phase reaction with styrene monomer was carried out at 40° C. The grafted membrane was washed with 1,1,1-trichloroethane, thoroughly dried, and sulfonated with a sulfuric anhydride/dioxane (1/1) adduct [Chem. Rev., 62, 549 (1962)].

Accordingly, a membrane D having an exchange equivalent of 0.46 meq/membrane (H type) was obtained. The data of the membrane D is shown in Table 1.

EXAMPLES 2 THROUGH 4

Membranes E, F and G differing in the grafting ratio of polyvinyl alcohol were obtained in the same manner as described in Example 1.

The data of the membranes E through G are shown in Table 1.

As is apparent from comparison of the data of the membrane A with the data of the membrane B in Table 1, the membrane B has an excellent hydrophilic property while maintaining 80% of the water permeation performance (the water permeation quantity after the ethanol treatment) of the membrane A. Furthermore, from comparison of the membranes B, C, and D, the water permeation performance of the membrane B of the present invention is much higher than that of the membrane having a carboxylic acid group or sulfonic acid group introduced therein.

The relationship between the oxygen/carbon atomic ratio X (%) on the outer surface of the microporous membrane and the hydrophilic ratio (%), observed in the membranes B, E, F, and G, is shown in FIG. 1. From FIG. 1, it is seen that in a membrane having an average pore diameter of about 0.2 $\mu$m, the hydrophilic ratio abruptly increases if X exceeds about 15%.

TABLE 1

| | Membrane | Grafting ratio (%) | Average pore diameter (μm) | Porosity (%) | Water permeation pressure (kg/cm²) | Water permeation quantity after ethanol treatment (l/m²·h·atm) | Water permeation quantity under pressure of 1 kg/cm² (l/m²·h·atm) | Hydrophilic ratio (%) | O/C ratio X on outer surface of porous membrane (%) | O/C ratio Y of entire porous membrane (%) | Remarks |
|---|---|---|---|---|---|---|---|---|---|---|---|
| Comparative Example 1 | A | 0 | 0.23 | 65 | Above 5 | 1760 | 0 | 0 | 0 | 0 | P.E. Membrane |
| Example 1 | B | 19 | 0.22 | 65 | Below 0.1 | 1410 | 1280 | 91 | 19 | 5.4 | Gas phase, PVA |
| Comparative Example 2 | C | 18 | — | — | Below 0.1 | 380 | 340 | 89 | — | — | Acrylic acid |
| Comparative Example 3 | D | 22 | — | — | Below 0.1 | Below 10 | Below 10 | — | — | — | Sulfonation |
| Example 2 | E | 11 | 0.23 | 65 | 0.7 | 1750 | 290 | 17 | 14 | 3.3 | Gas phase, PVA |
| Example 3 | F | 16 | 0.23 | 65 | 0.1 | 1500 | 1070 | 71 | 18 | 4.6 | Gas phase, PVA |
| Example 4 | G | 26 | 0.21 | 60 | Below 0.1 | 1230 | 1220 | 99 | 21 | 7.1 | Gas phase, PVA |

COMPARATIVE EXAMPLE 4

A hollow fiber membrane H having an inner diameter of 2 mm and a wall thickness of 0.6 mm was prepared in the same manner as described in Comparative Example 1 except that a composition comprising 18.5 parts by weight of high-density polyethylene, 54.3 parts by weight of dibutyl phthalate (DBP) and 27.2 parts by weight of finely divided silica was used. The data of the membrane H is shown in Table 2.

EXAMPLE 5

A membrane I was prepared in the same manner as described in Example 1 except that the membrane H obtained in Comparative Example 4 was used.

A slice having a wall thickness of 30 μm in the longitudinal direction of the fiber was cut from the membrane by using a microtome to confirm the treatment uniformity in the direction of membrane thickness, and 20 slices were thus obtained. The infrared spectrum of the central part of each slice was taken and the ratio of the absorbance of the peak attributed to the rocking vibration of $CH_2$ in the vicinity of 720 $cm^{-1}$ to the absorbance of the peak attributing to the C-O stretching vibration of the secondary hydroxyl group in the vicinity of 1100 $cm^{-1}$ was determined, and it was confirmed that the dispersion was within ±10%. The data of the membrane I is shown in Table 2.

EXAMPLE 5'

A membrane I' was obtained in the same manner as described in Example 1 except that the membrane H obtained in Comparative Example 4 was used and the reaction with vinyl acetate monomer was carried out under ice cooling. The data of the membrane I' is shown in Table 2.

COMPARATIVE EXAMPLE 5

The membrane I obtained in Example 5 was steam-treated at 121° C. for 30 minutes by using a steam sterilization apparatus. The data of the obtained membrane J is shown in Table 2.

EXAMPLE 6

The membrane J obtained in Comparative Example 5 was immersed in ethanol, the ethanol in the pores was replaced by water, and the membrane was treated with hot water at 80° C. for 1 hour to obtain a membrane K. The data of the membrane K is shown in Table 2.

EXAMPLE 7

A membrane L was obtained in the same manner as described in Example 1 except that the membrane H obtained in Comparative Example 4 was used and the reaction with vinyl acetate was carried out in the liquid phase. The data of the membrane L is shown in Table 2.

EXAMPLE 8

The membrane I obtained in Comparative Example 5 was immersed in a 10% aqueous solution of hydrochloric acid at 25° C. for 30 days, and the membrane was washed with water and dried to obtain a membrane M. The data of the membrane M is shown in Table 2.

EXAMPLE 9

A membrane N was obtained in the same manner as described in Example 8 except that a 20% by weight aqueous solution of NaOH was used. The data of the membrane N is shown in Table 2.

The tensile characteristics of the membranes H, I, M, and N at a deformation ratio of 100%/min are shown in Table 3.

TABLE 2

| | Membrane | Grafting ratio (%) | Average pore diameter (μm) | Porosity (%) | Water permeation pressure (kg/cm²) | Water permeation quantity after ethanol treatment (l/m²·h·atm) | Water permeation quantity under pressure of 1 kg/cm² (l/m²·h·atm) | Hydrophilic ratio (%) | O/C ratio X on outer surface of porous membrane (%) | O/C ratio Y of entire porous membrane (%) | Remarks |
|---|---|---|---|---|---|---|---|---|---|---|---|
| Comparative Example 4 | H | 0 | 0.33 | 70 | Above 5 | 1900 | 0 | 0 | 0 | 0 | P.E. Membrane |
| Example 5 | I | 21 | 0.31 | 70 | Below 0.1 | 1620 | 1550 | 96 | 20 | 5.9 | Gas phase, PVA |
| Example 5' | I' | 21 | 0.31 | 70 | Below 0.1 | 1560 | 1540 | 99 | 20 | 5.9 | Gas phase, PVA |
| Comparative Example 5 | J | 21 | 0.31 | 70 | 1.6 | 1580 | 0 | 0 | 9 | 5.9 | Steam treatment |
| Example 6 | K | 21 | 0.31 | 70 | Below 0.1 | 1590 | 1480 | 93 | 18 | 5.9 | Hot water treatment |
| Example 7 | L | 16 | 0.32 | 70 | Below 0.1 | 990 | 220 | 22 | 15 | 4.6 | Liquid phase, PVA |
| Example 8 | M | 21 | 0.31 | 70 | Below 0.1 | 1660 | 1570 | 95 | 20 | 5.9 | HCl treatment |
| Example 9 | N | 21 | 0.31 | 70 | Below 0.1 | 1630 | 1510 | 93 | 19 | 5.9 | NaOH treatment |

TABLE 3

| Membrane | | Elastic modulus (kg/cm$^2$) | Strength at break (kg/cm$^2$) | Elongation at break (%) |
| --- | --- | --- | --- | --- |
| Comparative Example 4 | H | 730 | 35 | 415 |
| Example 5 | I | 1430 | 50 | 45 |
| Example 8 | M | 1400 | 45 | 40 |
| Example 9 | N | 1450 | 50 | 45 |

Note

The measurements were conducted at 25° C.

From the data shown in Table 3, it is seen that the membrane I has an elastic modulus about 2 times the elastic modulus of the membrane H and the strength at break of the membrane I is at least 1.3 times the strength at break of the membrane H.

From comparison of the membrane I with the membrane H in Table 2, it is seen that the membrane I has an excellent hydrophilic property while maintaining 85% of the water permeation performance of the membrane H.

From comparison of the membrane I with the membrane J in Table 2, it is seen that even where the oxygen/carbon atomic ratio Y of the entire porous membrane is equal, if the oxygen/carbon atomic ratio X on the outer surface of the porous membrane differs, this results in a great difference of the hydrophilic property.

From the data of the membranes I, J and K, it is seen that, when the hydrophilic property of the membrane I within the scope of the present invention is reduced by steam treatment or the like, the hydrophilic property can be restored by hot water treatment or the like.

From a comparison of the membrane I with the membrane L, it is seen that the water permeation performance of the membrane L obtained by the liquid phase reaction is reduced to about 50% of that of the membrane H, although the grafting ratio is low, and that to impart a good hydrophilic property while retaining the water permeation performance, the gas phase reaction is preferred.

With reference to the acid resistance and alkali resistance, from a comparison of the membrane I with the membranes M and N, it is seen that, in the membrane of the present invention, the hydrophilic property and mechanical strength are not changed by the acid treatment and alkali treatment and the membrane of the present invention has an excellent chemical resistance.

COMPARATIVE EXAMPLE 6

A hollow fiber membrane O having an inner diameter of 0.7 mm and a wall thickness of 0.26 mm was prepared in the same manner as described in Comparison Example 1 except that a composition comprising 23.1 parts by weight of polypropylene, 55.4 parts by weight of DBP and 21.5 parts by weight of finely divided silica was used. The data of the membrane O is shown in Table 4.

EXAMPLE 10

A membrane P was obtained in the same manner as described in Example 1 except that the membrane O obtained in Comparative Example 6 was used. The data of membrane P is shown in Table 4.

As shown in Table 4, the membrane P shows a good hydrophilic property while retaining 88% of the water permeation performance of membrane O.

TABLE 4

| Membrane | Grafting ratio (%) | Average pore diameter (μm) | Porosity (%) | Water permeation pressure (kg/cm²) | Water permeation quantity after ethanol treatment (l/m²·h·atm) | Water permeation quantity under pressure of 1 kg/cm² (l/m²·h·atm) | Hydrophilic ratio (%) | O/C ratio X on outer surface of porous membrane (%) | O/C ratio Y of entire porous membrane (%) | Remarks |
|---|---|---|---|---|---|---|---|---|---|---|
| Comparative Example 6 | 0 | 0 | 0.27 | 70 | Above 5 | 3440 | 0 | 0 | 0 | 0 | P.P. Membrane |
| Example 10 | P | 18 | 0.26 | 70 | 0.3 | 3010 | 1030 | 34 | 16 | 5.2 | Gas phase, PVA |

EXAMPLE 11

The protein adsorption test was carried out by using the membrane A obtained in Comparative Example 1 and the membranes B, E, F, and G obtained in Examples 1 through 4.

Each membrane was immersed in ethanol and washed with water, and water in the pores of the membrane was replaced by a phosphate buffered saline solution (PBS) having a pH value of 7.2. The membrane was immersed in a bovine serum γ-globulin solution (1 mg/g PBS) and the equilibrium adsorption quantity was determined.

Figure 2:
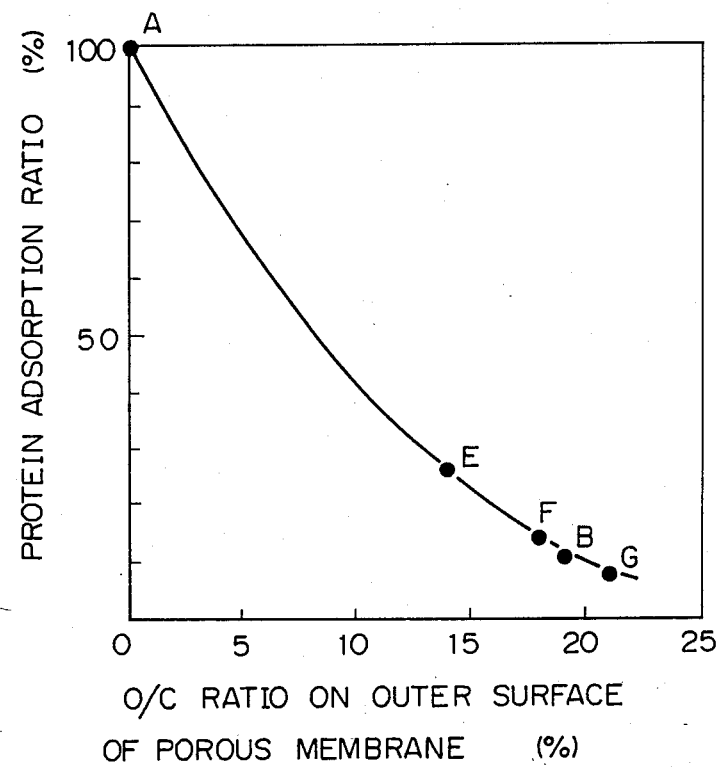
FIG. 2 is a diagram illustrating the relationship between the O/C atomic ratio X (%) on the outer surface and the protein adsorption ratio (%) in the microporous membrane of the present invention.

In FIG. 2, the equilibrium adsorption quantity is calculated based on the assumption that the equilibrium adsorption quantity of the membrane A is 100, and is plotted on the ordinate. The oxygen/carbon atomic ratio X on the outer surface of the membrane is plotted on the abscissa.

From FIG. 2, it is seen that the membrane of the present invention is superior to the untreated membrane in the protein-adsorbing property (the protein-adsorbing property is low).

Figure 3:
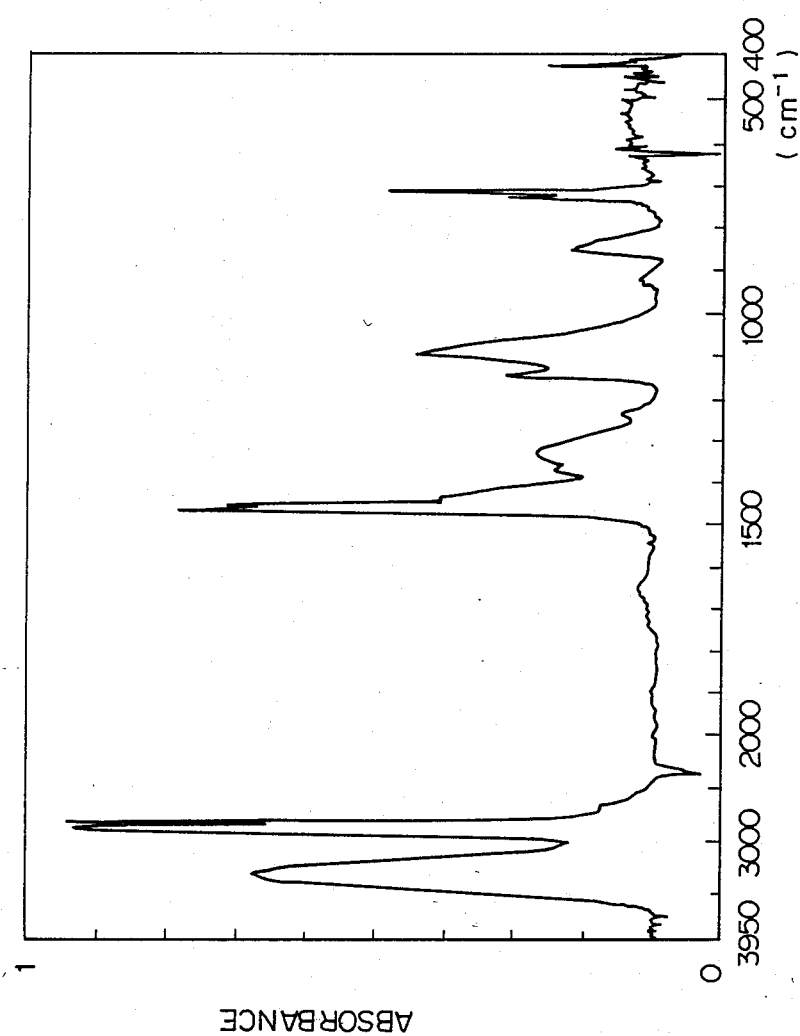
FIG. 3 is a typical infrared absorption spectrum of the porous membrane of the present invention.

A typical infrared absorption spectrum of the porous membrane of the present invention obtained by treating a hollow fiber microporous membrane of polyethylene is shown in FIG. 3.

EXAMPLE 12

A hollow fiber membrane bundle was formed by gathering 500 of the membranes H obtained in Comparative Example 4, each membrane having a length of 1.3 m. The bundle was irradiated with 20 Mrad of γ-rays at a dose of 0.65 Mrad/hr, and the reaction with vinyl acetate was carried out in the same manner as described in Example 1 except that the temperature was gradually elevated from $-10°$ C. to $2°$ C.

The obtained membrane was characterized by a grafting ratio of 19%, a water permeation pressure lower than 0.1 kg/cm$^2$, a water permeation quantity of 1520 l/m$^2$·hr·atom after the ethanol treatment, a hydrophilic ratio of 98%, an O/C ratio X of 19% on the outer surface of the porous membrane, and an O/C ratio Y of 5.4% in the entire porous membrane.

In this case, the grafting treatment unevenness $\sigma_{n-1}$ was 12 at a sampling ratio of 10% based on the assumption that the grafting ratio of 19% was 100.

As is apparent from the foregoing detailed description and the examples given hereinbefore, the present invention exerts excellent effects because a hollow fiber porous membrane which has a good hydrophilic property and an excellent chemical resistance, mechanical strength, water permeation performance, and durability can be provided.

I claim:

1. A hollow fiber microporous membrane comprising a polyolefin having a polyvinyl alcohol chemically bonded to the inner and outer surfaces of the hollow fiber membrane and the surfaces defining the pores thereof sufficient to provide a weight loss of not greater than 0.1% if the microporous membrane is washed with hot water at a temperature of higher than 80° C., and having an average pore diameter of 0.01 to 5 μm and a porosity of 20 to 80%, wherein the polyvinyl alcohol-polyolefin composition ratio is constant in the membrane thickness direction of the hollow fiber, the oxygen/carbon atomic ratio X on the outer surface of the hollow fiber microporous membrane is 10 to 50%, and the condition defined by the ratio $X/2 \geq Y$ is satisfied between said oxygen/carbon atomic ratio X and the oxygen/carbon atomic ratio Y in the entire microporous membrane.

2. A hollow fiber microporous membrane as set forth in claim 1, wherein the pore structure of the membrane is a three-dimensional network structure and the membrane has an inner diameter of 0.1 to 10 mm and a wall thickness of 0.05 to 5 mm.

3. A hollow fiber microporous membrane as set forth in claim 1, wherein the polyolefin is polyethylene.

4. A hollow fiber microporous membrane as set forth in claim 1, wherein the polyolefin is polypropylene.

5. A hollow fiber microporous membrane as set forth in claim 1, wherein the oxygen/carbon atomic ratio X on the outer surface of the hollow fiber microporous membrane is 15 to 50%.

6. A hollow fiber microporous membrane as set forth in claim 1, wherein the oxygen/carbon atomic ratio X on the outer surface of the hollow fiber microporous membrane is 20 to 50%.

7. A hollow fiber microporous membrane as set forth in claim 1, wherein the condition defined by the ratio $X/2.5 \geq Y$ is satisfied.

8. A hollow fiber microporous membrane as set forth in claim 1, wherein condition defined by the ratio $X/3 \geq Y$ is satisfied.

* * * * *